Aug. 6, 1957  D. A. ROGERS, JR., ET AL  2,801,945
INSULATING BARRIER TUBES AND METHOD OF MAKING SAME
Filed Dec. 6, 1954
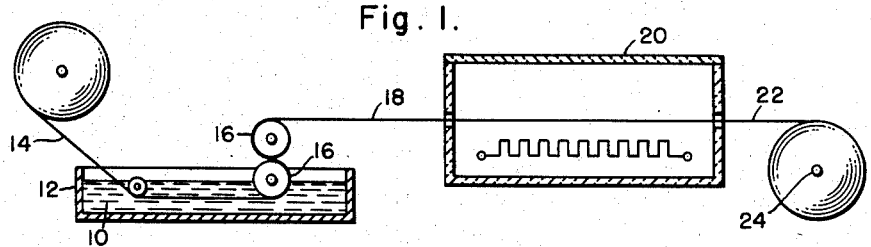
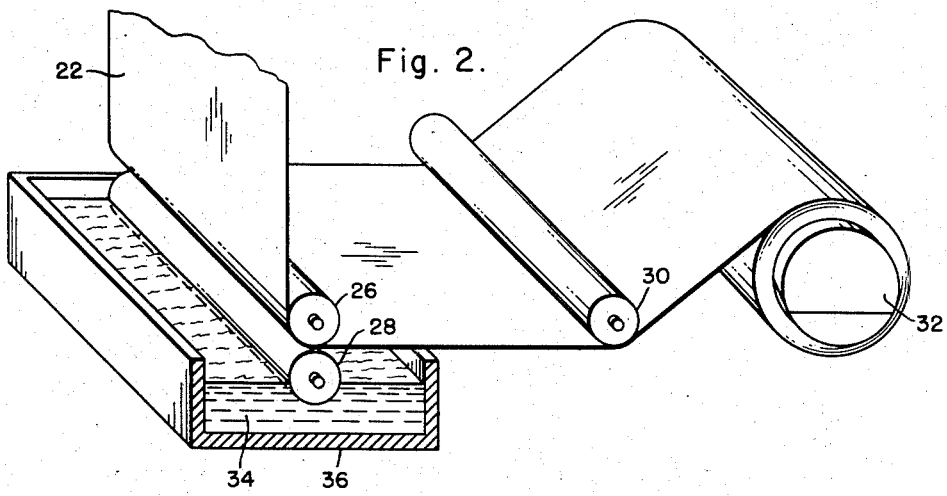
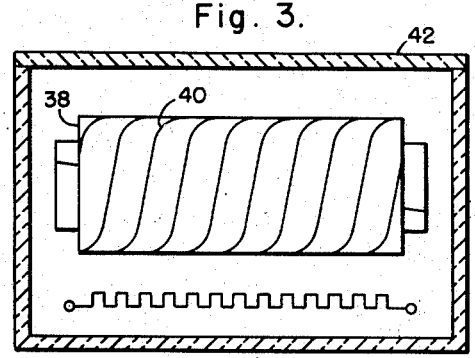
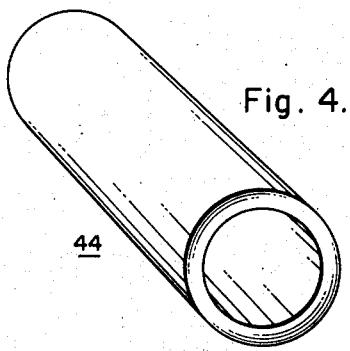
WITNESSES
Robert C. Baird
William D. Addison
INVENTORS
Dow A. Rogers, Jr. &
Newton C. Foster.
BY
Frederick A. Lapor
ATTORNEY United States Patent Office 2,801,945
Patented Aug. 6, 1957

2,801,945

INSULATING BARRIER TUBES AND METHOD OF MAKING SAME

Dow A. Rogers, Jr., Whitehall Boro, and Newton C. Foster, Pittsburgh, Pa., assignors to Westinghouse Electric Corporation, East Pittsburgh, Pa., a corporation of Pennsylvania Application December 6, 1954, Serial No. 473,448

6 Claims. (Cl. 154—83)

The present invention relates to a method of fabricating tubes having high mechanical and dielectric strength particularly suitable for use in high voltage transformers.

In the building of certain high voltage transformers, there are required insulating barrier tubes having extremely high mechanical and dielectric strength. In such transformers, coils are wrapped around the barrier tubes, the coil being separated from the tube by porcelain blocks. The blocks are driven into position by hammer blows and the tube must have a mechanical strength sufficient to withstand such impact. The tubes also must be capable of withstanding the high temperatures at which the transformers operate and also must have high dielectric strength and low power factor.

Barrier tubes used heretofore in transformers have been fabricated from paper impregnated with phenolformaldehyde resins or from glass cloth impregnated with various silicone resins. The former type of tube, although economical, does not have sufficient thermal stability and dielectric strength to permit its incorporation in many high voltage transformers. The latter type of tube has excellent thermal stability but is quite expensive.

It is the object of the present invention to provide a method for preparing tubes which includes first impregnating pliable material with a polyester resin, then applying a mixture of a completely reactive monomer and catalyst to the resin impregnated pliable material and winding a tube therefrom.

It is a further object of the invention to provide a method for preparing insulating tubes from glass fiber sheet material and polyester resins, having high mechanical and dielectric strengths.

Other and further objects of the invention will, in part, be obvious and will, in part, appear hereinafter.

For a more complete understanding of the present invention, reference is made to the following description taken in conjunction with the accompanying drawing, in which:

Fig. 1 is a cross-sectional view illustrating the application of a solution of an unsaturated polyester resin to a length of pliable sheet material;

Fig. 2 is a fragmentary diagrammatic view, partly in cross-section, illustrating the winding of a tube and the application thereto of a mixture of a monomer and catalyst in accordance with this invention;

Fig. 3 illustrates the curing of a tube in an oven; and

Fig. 4 is a view of a finished tube prepared in accordance with the process of this invention.

Briefly, in the attainment of the foregoing objects and in accordance with the present invention there is provided a process for the preparation of tubular electrical members having insulating properties which comprise wrapping a length of polyester resin-impregnated pliable material about a mandrel to form members of a desired size and shape, applying a mixture of at least one liquid, unsaturated reactive monomer having the group $>C=C<$ and at least one addition-type polymerization catalyst to said pliable material while it is being wrapped about the mandrel, and heating the wrapped member to convert the resin to a hard, thermoset state.

It is an important feature of this invention that tubes may be prepared by the method herein disclosed using readily available tube rolling machinery. The tubes so produced have the high mechanical and dielectric strengths desired and have excellent heat stability at temperatures even higher than those encountered in service of high voltage transformers.

More specifically, tubes particularly suitable for use as barrier tubes in high voltage transformers, are prepared, in accordance with this invention, by applying a quantity of a solution of an unsaturated polyester resin to a length of pliable sheet material. The resin preferably is employed in solution in an organic solvent having a boiling point below 175° C. As illustrated in Fig. 1 of the drawing, a quantity of resin solution 10 is contained within a tank 12. Pliable sheet material 14 is passed through solution 10 in tank 12 and then between a pair of squeeze rolls to insure complete impregnation and the elimination of entrapped air. The pliable sheet material with the polyester resin applied thereto, as illustrated at 18, then is heated to a temperature and for a period of time sufficient to volatilize the solvent therefrom. This conveniently may be accomplished by passing the pliable sheet material 18 through a heated tower or oven 20 maintained at a temperature sufficient to vaporize the solvent. The temperature and the drying time should be controlled carefully to avoid overheating the resin. Upon removal from the heating tower or oven 20, the cloth 22 is completely dry in appearance and to the touch and may be rolled on a spool 24 without the use of cellophane, polyethylene, or other separating sheet or lining material. The polyester resin is not thermoset or cured at this stage. Thereafter, the polyester impregnated sheet material is placed on a tube winding machine and slowly wound under tension of about 5 to 20 pounds per square inch of linear width of the sheet onto a mandrel to form a tube of a desired shape. As the polyester impregnated sheet material is wound upon the mandrel the surface is treated with a mixture comprising at least one liquid, unsaturated reactive monomer having the group $>C=C<$ and at least one addition-type polymerization catalyst. The monomer is miscible and compatible with the polyester resin whereby it softens and penetrates into it and rapidly blends to form a completely reactive polymerizable resinous composition. The wrapped tube then is heated to polymerize the completely reactive composition to a solid, thermoset resin.

The winding of the tube and the application thereto of the mixture of monomer and catalyst are illustrated diagrammatically in Fig. 2. Cloth 22 is passed between a pair of rolls 26 and 28, beneath roll 30 and then wound under tension on a mandrel 32. Roll 28 is suspended in a liquid mixture 34 of an unsaturated monomer and catalyst contained within a tank 36 and in its rotation picks up a coating thereof on its surface. As cloth 22 passes between rolls 26 and 28 an even coating of the mixture 34 is applied from the roll 28 to the cloth.

As illustrated in Fig. 3, the wound tube 38, with a covering layer of a tape 40 of a suitable material such as polyethylene terephthalate, is placed in an oven 42 and heated at a sufficient temperature until the applied resinous mixture has cured. Upon completion of curing, the tube 38 is removed from the oven 42, tape 40 is stripped therefrom and mandrel 32 is removed to leave the finished tube 44 illustrated in Fig. 4.

The monomer is employed in an amount sufficient to blend with the resin completely but not in such a large amount that the resin will squeeze out during winding the tube under tension. The ratio of monomer to unsaturated resin should be within the range of from 15:85 to 50:50 parts by weight.

The unsaturated polyester which is applied to the pliable material may be prepared conveniently by esterifying a polyhydric alcohol having no other reactive groups than the hydroxyl groups with a substantially molar equivalent of at least one ethylenically unsaturated alpha, beta dicarboxylic acid and anhydrides thereof.

The ethylenically unsaturated alpha, beta dicarboxylic acids which may be employed in accordance with this invention include maleic acid, fumaric acid, maleic anhydride, monochloromaleic acid, itaconic acid, itaconic anhydride, citraconic acid, and citraconic anhydride. In preparing the polyester, up to 95% of the weight of the unsaturated acidic component may be replaced with one or more saturated dicarboxylic acids having from 2 to 10 carbon atoms per molecule, the carboxyl groups being located at the end of the chains and no other reactive groups being present thereon. Examples of such acids include succinic acid, adipic acid, sebacic acid, phthalic anhydride or the like.

The polyhydric alcohols which are suitable for use in accordance with this invention include those aliphatic alcohols having no other reactive groups than the hydroxyl groups. Examples of suitable alcohols include ethylene glycol, glycerol, pentaerythritol, propylene glycol, diethylene glycol, 1,5-pentanediol and triethylene glycol. Mixtures of polyhydric alcohols also may be employed and in some cases epoxides may be used in place of glycols, particularly in reaction with dicarboxylic acids instead of their anhydrides. Castor oil also may be employed in reactions with maleic anhydride. The polyhydric alcohol should be employed, with respect to the total amount of the acidic components, in a molar equivalent, ±10%.

The polyester resins are prepared by reacting the acidic components and the polyhydric alcohol in accordance with usual esterification procedures. For example, the acidic components and the polyhydric alcohol are heated under reflux in the presence of an esterification catalyst such as hydrochloric acid, sulphuric acid, benzene sulfonic acid or the like. Removal of water formed in the reaction to increase the degree of esterification may advantageously be effected by utilizing azeotropic distillation as, for example, by carrying out the reaction in the presence of a volatile organic liquid such as toluene, xylene or the like.

The unsaturated polyester resin is employed in solution by dissolving it in an organic solvent having a boiling point of 175° C. or less. This boiling point should not be exceeded since it is necessary to evaporate the solvent from the pliable material during the heating operation while avoiding pre-polymerizing or otherwise detrimentally affecting the polyester resin. Examples of suitable organic solvents which may be employed in accordance with the present invention include aliphatic and aromatic compounds such as acetone, benzene, methyl-ethyl ketone, toluene, ethyl acetate, and mixtures of two or more.

The pliable sheet material employed in forming the barrier tubes of this invention preferably is selected from that class of materials which has high mechanical strength. Examples of particularly suitable materials from this class include glass cloth and glass mat. The pliable material, namely the glass cloth or glass mat, may be used in the form of sheets as much as 60 inches in width or in the form of a tape having a width from about one-eighth of an inch or less to five or six inches or more. The tape or sheet material may vary in thickness from about 1 to 30 mils.

Examples of liquid reactive unsaturated monomers having the group $>C=C<$ which may be employed in this invention include monostyrene, vinyl toluene, alpha-methylstyrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene, and divinyl benzene, as well as mixtures of two or more of any of these monomers.

The liquid reactive unsaturated monomer is employed in this invention in admixture with at least one addition-type polymerization catalyst. Examples of such catalysts are benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts in an amount of from 0.1% to 2% by weight, based on the total weight of the impregnating composition, although somewhat larger or smaller amounts may be employed if desired. Polymerization accelerators such as cobalt naphthenate and azomethines also may be admixed with the monomers and the catalysts in the impregnating composition.

To illustrate even more fully the advantages and capabilities of the present invention, the following examples are set forth. The parts and percentages given are by weight unless otherwise indicated.

Example I

A mixture of 3910 grams (11 moles) of 2,2-bis-[para-hydroxyethoxyphenyl] propane and 1090 grams (10 moles) of maleic anhydride were reacted while being sparged with carbon dioxide in a closed vessel at a temperature of 200° C. until the mixture had an acid number of 25. The mixture then was cooled and 0.008% hydroquinone, based on the weight of the initial mixture of ingredients, was added at a temperature of 160° C. The polyester thus prepared was admixed with acetone in an amount sufficient to form a 50% solution.

Example II

A mixture of 44 mole percent of adipic acid and 6 mole percent of fumaric acid was combined with 50 mole percent of propylene glycol and reacted with carbon dioxide sparging for a period of about 4 hours at a temperature of 140° C. in a closed reaction vessel. The temperature then was raised to 220° C. over a 4-hour period, and the reaction then continued at that temperature for an additional 8 hours. A syrupy polyester resin was obtained and admixed with toluene in an amount sufficient to form a 50% solution.

Example III

A composition comprising the reaction product of 10 mole percent of maleic anhydride, 40 mole percent of adipic acid, and 50 mole percent of diethylene glycol was prepared according to the procedure described in Example II. This resin then was mixed with methyl ethyl ketone to form a 50% solution.

Example IV

A syrupy polyester resin was prepared according to the procedure described in Example I by reacting 30 mole percent of sebacic acid, 20 mole percent of maleic anhydride, and 50 mole percent of diethylene glycol. This resin was mixed with benzene in an amount sufficient to form a 50% solution.

Example V

A quantity of the polyester-acetone solution prepared in accordance with the procedure described in Example I was placed in a dip tank. A length of closely woven glass cloth 37 inches wide and of a thickness of 7 mils, was passed through the polyester-acetone solution in the tank and then through a series of squeeze rolls to insure complete impregnation of the glass cloth and to eliminate any entrapped air. The impregnated wet cloth then was passed through a 20 foot tower heated to a temperature sufficient to vaporize all the acetone from the cloth. The impregnated and dried cloth then was rolled on a spool. The spool was placed on a tube rolling machine and the cloth withdrawn therefrom and wrapped under tension about a cylindrical mandrel rotating at a speed sufficient to permit convenient uniform application thereto of a mixture of monostyrene and benzoyl peroxide. The various ingredients were applied to the cloth in a quantity such that the finished tube contained 50 parts by weight of thermoset resin for each 50 parts by weight of glass cloth, the thermoset resin comprising 80% by weight of unsaturated polyester resin, 20% by weight of monostyrene based on the weight of the polyester resin, and 0.5% by weight of benzoyl peroxide based on the weight of the polyester resin and monostyrene.

A cover layer of polyethylene terephthalate tape was wrapped about the wound tube, after which the mandrel and tube were placed in an oven and cured. The curing cycle comprised maintaining the tube at 90° C. for 8½ hours and then at 140° C. for an additional 8 hours. The mandrel and tube then were removed from the oven, the cover layer stripped from the tube and the tube removed from the mandrel. The tube was 37 inches in length and had an inside diameter of $15^{15}/_{16}$ inches and an outside diameter of 16¼ inches, the average wall thickness being $5/_{32}$ inch. The finished tube was excellent in appearance, having smooth inner and outer surfaces.

Upon testing the tube for dielectric strength, the following results were obtained at three different points along the tube:

1. Straight rise:
    Flash over at 107 kv., 322 v./mil
2. Hold test starting at 70 kv. with 5 kv. steps:
    70 kv.—1 minute
    75 kv.—1 minute
    80 kv.—1 minute
    85 kv.—1 minute
    90 kv.—1 minute
    95 kv.—1 minute, 302 v./mil hold
    100 kv.—flash over after 30 sec., 317 v./mil flash
3. Hold test starting at 70 kv. with 5 kv. steps:
    70 kv.—1 minute
    75 kv.—1 minute
    80 kv.—1 minute
    85 kv.—1 minute, 284 v./mil hold
    90 kv.—flash over after 47 sec., 300 v./mil flash
4. Hold tests starting at 70 kv. with 5 kv. steps:
    70 kv.—1 minute
    75 kv.—1 minute
    80 kv.—1 minute
    85 kv.—1 minute
    90 kv.—1 minute, 286 v./mil hold
    95 kv.—flash over after 16 sec., 302 v./mil flash The power factors obtained on this tube are as follows:

| Temp., °C. | 100×tan δ | | | Dielectric Constant | | |
|---|---|---|---|---|---|---|
| | 60 Cy | 1 Kcy | 100 Kcy | 60 Cy | 1 Kcy | 100 Kcy |
| 24 | 0.56 | 0.39 | 0.80 | 4.55 | 4.53 | 4.46 |
| 75 | 2.15 | 0.85 | 0.72 | 4.85 | 4.75 | 4.66 |
| 125 | 4.00 | 1.91 | 1.06 | 4.91 | 4.70 | 4.52 |

Tubes prepared in accordance with this invention also have excellent mechanical strength. They withstand the impact of hammer blows used to drive porcelain blocks between the tubes and coil surrounding the tube. The excellent impact resistance of the tubes also has been demonstrated by the fact that no fractures or breaks occurred when tubes were dropped from a five-story building onto a concrete floor.

The performance of the tubes of this invention which have been incorporated in high voltage transformers is superior to that of tubes prepared by applying a mixture of resin, monostyrene and catalyst to glass cloth in one step. In contrast to such prior art tubes, the tubes of this invention are free from voids and are uniform throughout their length. They have much improved mechanical and dielectric strength.

While the present invention has been described with reference to particular embodiments thereof, it will be understood, of course, that many changes, substitutions, modifications and the like may be made therein without departing from its true scope.

We claim as our invention:

1. A process for the preparation of tubular electrical members having insulating properties which comprises wrapping a length of polyester resin-impregnated pliable material having high mechanical strength about a mandrel to form electrical members of a desired shape, applying a mixture of at least one liquid, unsaturated reactive monomer having the group $>C=C<$ and at least one addition-type polymerization catalyst to said pliable material while it is being wrapped about the mandrel, and heating the wrapped member to convert the resin to a uniform, hard, thermoset state which is free from voids.

2. A process as set forth in claim 1 wherein the polyester resin comprises a polyester obtained by reacting a polyhydric alcohol having on other reactive groups than the hydroxyl groups with a substantially molar equivalent of at least one ethylenically unsaturated alpha, beta dicarboxylic acid and anhydrides thereof.

3. A process for the preparation of tubular electrical members having insulating properties which comprises applying to a length of pliable material having high mechanical strength a solution of a polyester resin dissolved in a solvent, heating said pliable material with the resin solution applied thereto to remove the solvent therefrom, wrapping said pliable material about a mandrel to form electrical members of a desired shape, applying a mixture of at least one liquid, unsaturated reactive monomer having the group $>C=C<$ and at least one addition-type polymerization catalyst to said pliable material while it is being wrapped about the mandrel, and heating the wrapped member to convert the resin to a uniform, hard, thermoset state which is free from voids.

4. A process for the preparation of tubular electrical members having insulating properties which comprises applying a quantity of a polyester resin dissolved in an organic solvent having a boiling point below 175° C to a length of glass cloth, thereafter heating the cloth and the applied resin solution to a temperature and for a period of time sufficient to volatilize the solvent therefrom, wrapping said resin treated glass cloth about a mandrel to form electrical members of a desired shape, applying a mixture of at least one liquid, unsaturated reactive monomer having the group $>C=C<$ and at least one addition-type polymerization catalyst to said glass cloth while it is being wrapped about said mandrel, said monomer being miscible and compatible with the polyester resin whereby it blends with the polyester to form a completely reactive polymerizable composition, and heating the wrapped member to polymerize the completely reactive composition to a uniform, solid, thermoset resin which is free from voids.

5. A process as set forth in claim 4 wherein the polyester resin comprises a polyester obtained by reacting (a) from 100 to 60 mol percent of at least one ethylenically unsaturated alpha, beta dicarboxylic acid and anhydrides thereof, and (b) from 0 to 40 mol percent of at least one straight chain saturated dicarboxylic acid having 2 to 10 carbon atoms per molecule, the carboxyl groups being located at the ends of the chain and no other reactive groups being present thereon, with (c) a molar equivalent within ±10% of the acidic components of a polyhydric alcohol having no other reactive groups than the hydroxyl groups present thereon.

6. An electrical member having insulating properties comprising a tube formed by applying to a length of pliable material having high mechanical strength a solution of a polyester resin dissolved in a solvent, heating said pliable material with the resin solution applied thereto to remove the solvent therefrom, wrapping said pliable material about a mandrel to form a tube member of a desired shape, applying a mixture of at least one liquid, unsaturated reactive monomer having the group >C=C< and at least one addition-type polymerization catalyst to said pliable material while it is being wrapped about the mandrel, and heating the wrapped member to convert the resin to a uniform, hard, thermoset state which is free from voids.

References Cited in the file of this patent

UNITED STATES PATENTS

| | | |
|---|---|---|
| 1,458,943 | Kinney | June 19, 1923 |
| 1,470,990 | Lucas | Oct. 16, 1923 |
| 2,371,050 | Hyde | Mar. 6, 1945 |
| 2,407,479 | D'Alelio | Sept. 10, 1946 |
| 2,409,633 | Kropa | Oct. 22, 1946 |
| 2,418,633 | Gould | Apr. 8, 1947 |
| 2,489,985 | Speight | Nov. 29, 1949 |
| 2,653,887 | Slayter | Sept. 29, 1953 |
| 2,690,412 | Nebesar | Sept. 28, 1954 |
| 2,706,497 | Shobert | Apr. 19, 1955 |